May 25, 1954

L. W. PARKER

TELEVISION RECEIVER WITH REGULATED HIGH-VOLTAGE POWER SUPPLY 2,679,550

Filed Dec. 17, 1947

2 Sheets-Sheet 1

INVENTOR.
Louis W. Parker
BY
Julius E. Foster

INVENTOR.
Louis W. Parker
Julius E. Foster

Patented May 25, 1954 2,679,550

UNITED STATES PATENT OFFICE 2,679,550

TELEVISION RECEIVER WITH REGULATED HIGH-VOLTAGE POWER SUPPLY

Louis W. Parker, Little Neck, N. Y.

Application December 17, 1947, Serial No. 792,217

8 Claims. (Cl. 178—7.5)

This invention relates generally to a system for developing a high direct voltage power supply that is self-compensating for load variations, and the system is particularly applicable as a power supply system for the picture tube of a television receiver, to which the invention is shown applied herein, by way of example.

A primary object of this invention is to provide a high direct voltage power supply that is self-regulating to compensate for load variations.

Another object of the invention is to provide such a power supply system in which the regulation is effected by electronic means, or by electromagnetic and electronic means.

Another object of this invention is to provide a system for generating a high direct voltage for use on a television picture tube, with provisions for stabilizing the voltage for the second anode of the tube under varying impedance conditions within the tube.

Another object of the invention is to provide a regulating system for controlling the operation of a picture tube, to prevent undue variation of the picture area on the picture tube screen in response to variations of the voltage bias on the control grid of the picture tube.

The reason why the picture area varies so may be realized upon considering the manner in which the Kinescope is energized and operated.

In present conventional television receivers, the picture tube embodies a cathode gun which generates an electron beam, that is guided to strike a screen surface of luminescent material upon which the picture is reproduced by the action of the beam. In addition to the cathode (and a heater therefor), the tube is provided with a control grid and two electrodes, usually identified as the first anode and the second anode. The control grid according to its voltage varies the intensity of the electron beam, and, therefore, the brilliance of the beam spot effect, or picture, on the screen. The two anodes, in accordance with the respective voltages applied to them, establish a focusing action on the beam for the purpose of locating the focussed spot at the end of the beam directly on the screen surface.

In operating the tube a high direct voltage is applied to the second anode. The intensity of the voltage required is generally a function of the length of the tube. In the case of a present conventional tube having a screen diameter of 10 inches, for example, the length may be 18 to 20 inches, and the voltage required for the second anode may be of the order of 9000 volts.

Since the television receiver is usually operated by energy from a house lighting circuit of sixty cycles at about 120 volts, such a high direct voltage for the second anode of the picture tube could readily be derived from that lighting circuit through a suitable step-up transformer and a rectifier. However, such a system would require special precautions since the full power of the system supplying the lighting circuit would be available on short circuit in the receiver, as in case of bodily human contact with such a high voltage terminal on the tube. Therefore, a circuit of relatively limited power is preferably utilized for safety in energizing the second anode of the tube. Such power supply is adequate however to operate the tube, and is in fact more economical. The particular circuit that is used is one which is available in the usual receiver and which is employed to generate a deflecting field to move the electron beam back and forth across the screen surface.

A deflecting field may be generated in a picture tube by an electrostatic field, or by an electromagnetic field, or in some instances by both. The larger tubes preferably employ electromagnetic deflection, which is established by a magnetic field induced by a coil or yoke disposed alongside the neck or body of the tube, between the cathode and the second anode. The coil is energized by a voltage wave to establish the deflecting action that shifts the electron beam so it will scan or sweep across the screen surface. That wave is a combination of saw-tooth and pulse form, and rises preferably linearly in amplitude for the saw-tooth portion during the time interval in which the deflection is to be effected in the operative or forward direction. The wave direction then quickly reverses during the pulse portion to cause the electron beam to move back to an initial point in its scanning or sweep path, and to enable the voltage wave to start and rise again from the same starting point.

The horizontal deflection equipment generates the deflection wave of proper shape and duration. That wave is the combination saw-tooth and pulse voltage and it is induced in the primary winding of an output transformer fed from the final electron tube of the horizontal deflection equipment. The stepped-up voltage of that saw-tooth and pulse wave is then rectified and filtered to supply the high direct voltage for the second anode of the picture tube. That rectified voltage, although of high intensity in order to establish the required electrostatic field for the electrons from the cathode, is nevertheless relatively safe to accidental human contact, since the maximum possible output power of the tube that feeds the output transformer is too low to be harmful.

Thus, the use, in conventional receivers, of the power derived from the saw-tooth and pulse wave, which may be referred to as a surge power system, has provided a safety factor that has eliminated much of the hazard of high voltages from television equipment designed for home use, and as indicated above, has introduced some economy into the manufacture of the receiver.

The provision of this safety factor has introduced, however, at the same time, a problem in the operation of adjustably varying the brilliance of the picture on the screen through adjustment of the bias voltage on the control grid.

The internal impedance of a picture tube varies somewhat similarly to that of a triode with variation of bias voltage or signal strength on the grid. As the control grid potential in a triode is made less negative the internal impedance diminishes and the plate current increases. Similarly in the picture tube the current of the second anode also increases. Due to the internal impedance of the power supply the supply voltage decreases with increasing current. Consequently, the voltage supplied to the second anode also decreases. From that result arises the problem which the present invention is provided to cure.

In a picture tube, the deflection of the electron beam varies directly with the deflecting field but inversely as a function of the voltage between the cathode and the second anode. Consequently, when the potential of the second anode decreases, the deflection of the beam is permitted correspondingly to increase. Thus, for example, relatively slow adjustment of the bias voltage of the control grid in order to increase the brilliance of the picture, would decrease the tube impedance. The potential of the second anode would also decrease due to the high internal impedance of the power supply. The deflection would therefore increase and would establish a resulting enlarged picture. In addition, part of the increased brilliance expected from the bias adjustment of the control grid, would therefore not be obtained because the increased electron beam intensity would become distributed over a larger area than the beam covered at the beginning of the adjustment variation. This is essentially a de-focussing of the beam, with corresponding loss in sharpness and clearness of the picture. In addition the enlargement of the picture may cause some border portions of the picture to move beyond the screen area and become lost.

The present invention cures that problem by preventing the potential on the second anode from varying enough to affect the picture area or focus, in response to adjustment variations in the bias voltage of the control grid.

In general, the principle of this invention involves the disposition of an auxiliary variable impedance device as a regulator between the source of energy for the rectified high direct voltage, and the second anode of the picture tube, with appropriate control of that variable impedance device to maintain the voltage as applied to the second anode of the picture tube relatively steady, so any variations are limited to a narrow range.

In one form of the invention the auxiliary variable impedance device is essentially a triode connected to function in the manner of a cathode follower, with the picture tube connected as the cathode impedance of the triode.

One particular object of this invention, therefore, is to provide a self-regulating system for a television receiver utilizing a surge power supply for the second anode of the picture tube, whereby the potential on that second anode is kept relatively constant so the picture area and the beam focus are kept from changing substantially, during adjustment variations made in the bias voltage on the control grid to effect a change in brilliancy on the screen.

Other objects of the invention will be pointed out in the following description at appropriate places where the explanations relating thereto will be more easily understood.

The manner in which this invention operates when applied to a television receiver with a surge-power-operated picture tube is described with reference to the accompanying drawings, in which Figure 1 is a simplified block diagram of a television receiver system, showing in the enclosing broken line the part of the receiver equipment to which this invention is applied;

Figures 1, 2:
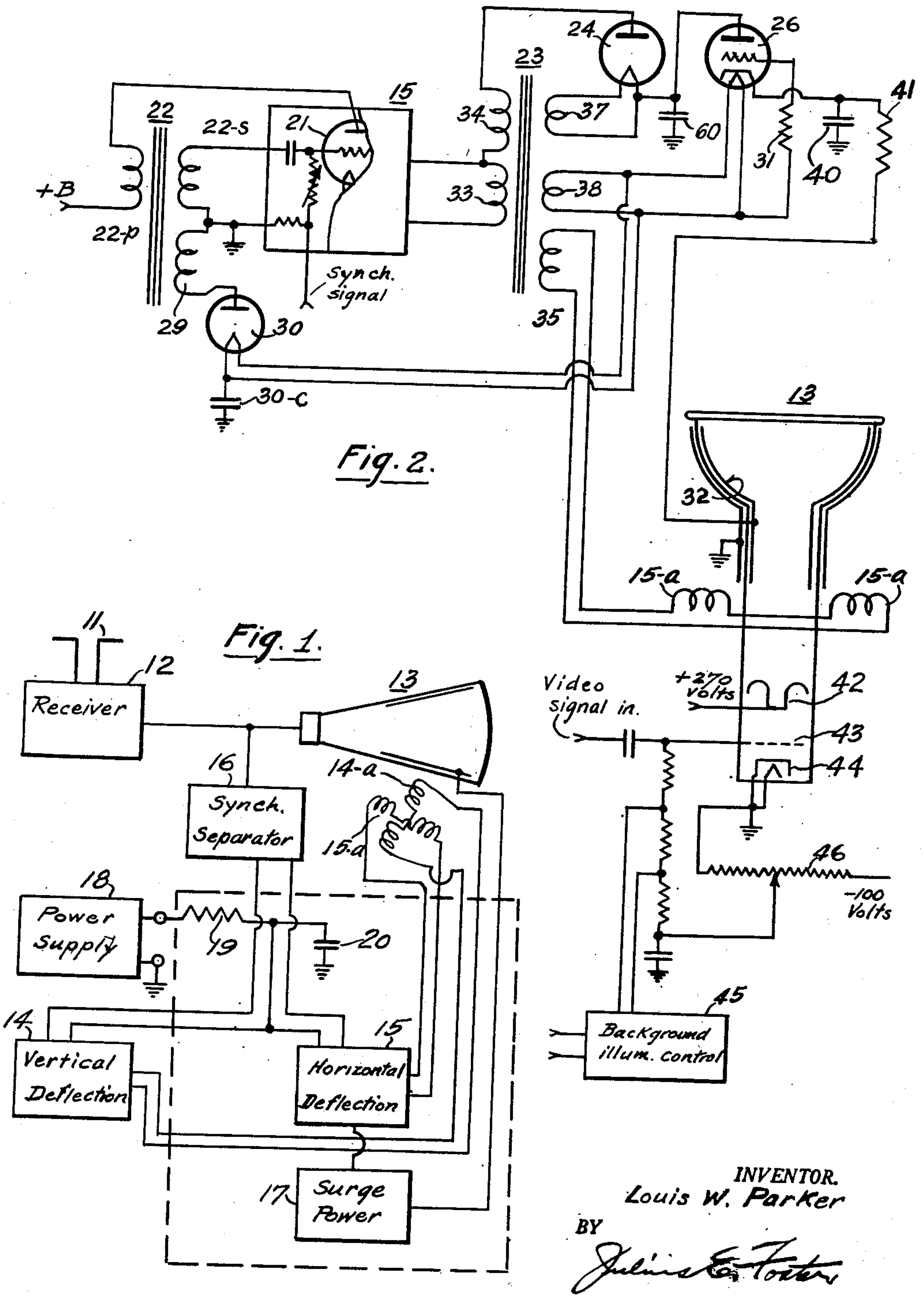
Figure 2 is a simplified diagram of part of the receiver equipment shown in the broken line enclosure of Fig. 1, with a regulating tube in series with the high voltage rectifier.

In Fig. 1, a simplified block diagram of a television receiver is shown. The components are indicated very generally that will need to be particularly referred to in explaining the application of the present invention to the receiver. As shown, a conventional television receiving system comprises an antenna 11 which feeds any signals induced therein to a receiver 12. The receiver block 12 includes many usual components that need not be shown here. Those components that are needed to explain the invention, include a picture tube 13, vertical deflecting equipment 14 and horizontal deflecting equipment 15 which supply current waves of appropriate shape and at proper times to corresponding deflecting coils 14–*a* and 15–*a* adjacent the neck of the picture tube 13, to cause deflection of the electron beam in the appropriate directions in the picture tube.

A synchronism signal separator 16 serves to separate out of the composite video signal received over the antenna, the appropriate synchronizing signals for controlling the vertical and the horizontal deflection equipment.

For the operation of the picture tube 13, a high direct voltage is required to energize the second anode. That anode corresponds in a sense to the plate or anode of the usual electronic tube. In many present conventional receivers the horizontal deflection equipment 15 which generates the appropriate voltage wave for energizing the deflecting coil 15–*a* is also employed to serve as a surge power source 17 to induce a high alternating voltage and then to rectify that voltage and supply the resulting high direct voltage to the second anode of the Kinescope.

The present invention utilizes and modifies in part the action of the horizontal deflection equipment 15 and of the surge power supply 17 of Fig. 1, to control the response of the picture tube to adjustments made in the receiver manually or electronically to vary the brilliance of the picture formed on the screen.

Because of certain actions that occur in the system, which can be better described later, a common source of power or plate supply 18 is employed for the vertical and for the horizontal deflecting equipments 14 and 15, and the plate voltages for both equipments are fed through a common impedance shown as a resistor 19. The condenser 20 is provided as a grounding condenser.

In Fig. 2 the invention is shown applied to the portion of a television receiver including the horizontal deflection equipment for generating both a deflection current wave and a high alternating-current voltage, a rectifier for said high voltage, and the Kinescope tube to be supplied with the rectified high voltage.

The component elements of the portion of the system in Fig. 2 comprise, generally, the horizontal deflection equipment 15 shown in block and including a blocking oscillator tube 21 with a control transformer 22, a horizontal output transformer 23 fed from the final tube of the deflection equipment 15, a high-voltage diode rectifier 24 to supply a high direct voltage to the second anode of the picture tube 13, and a variable impedance device 26, shown here as a triode, for regulating the voltage from the diode 24 to the Kinescope 13 in accordance with this invention. Condenser 60 is connected between the cathode of diode 24 and ground.

The horizontal deflection equipment shown by the block 15 is controlled by a local blocking oscillator that is triggered by a synchronizing pulse from the horizontal synchronizing pulse separator 16 of the receiver (Fig. 1). The oscillator tube 21 is included in the block 15, and only that oscillator tube need be shown for this explanation.

The primary 22–*p* of the oscillator transformer 22 is connected in the plate supply circuit of oscillator tube 21. One end of the secondary 22–*s* is connected to the grid of the oscillator tube 21 through a grid condenser 28, and the other end of the secondary 22–*s* is grounded.

An auxiliary secondary winding 29 on the blocking oscillator transformer 22 supplies a constant periodic voltage which is rectified by a diode 30 to provide a constant control voltage for the grid of the regulator tube 26 through a resistor 31 to establish the regulating function of that tube. No power is taken from diode 30.

The horizontal deflection equipment 15 is employed to provide principally two voltages, the first one being an appropriate voltage to energize the yoke or deflecting coil 15–*a* of the Kinescope 13, and the other being the high A. C. voltage which when rectified provides the high direct voltage for the second anode 32 of the picture tube. Both voltages are derived through the horizontal output transformer 23. The primary winding 33 is in the output circuit of the horizontal deflection equipment 15. An auto-transformer winding 34 connected to the primary 33 provides the stepped-up voltage to be supplied to the diode 24 to be rectified and supplied to the second anode 32 through the regulator tube 26. An insulated secondary 35 feeds the combination saw-tooth and pulse voltage to the deflecting coils 15–*a*. Two heating secondaries 37 and 38 are provided for the cathode of diode 24 and for the heater for the cathode of the regulator tube 26, respectively. The heating secondary 38 may also be used for the filament of the auxiliary diode 30.

The output of the high voltage diode 24 is applied to a condenser 39 and to the plate of the regulator tube 26. The regulator tube 26 is connected between the cathode of diode 24 and the second anode 32 of the picture tube 13, to serve as a variable impedance device between that diode 24 as a voltage source and the picture tube 13 as a variable load.

The cathode of the regulator tube 26 serves as the output electrode of that tube and supplies its output to a load condenser 40 and through a resistor 41 to the second anode 32 of the picture tube 13. The picture tube thus constitutes a cathode impedance for the regulator tube 26. That regulator tube 26 acts as a cathode follower and the output potential at the cathode will follow the grid potential in the regulator tube 26. That grid, therefore, for the purpose of this invention is purposely held at a steady potential in order to hold the cathode of the regulator tube also at a relatively steady potential, that is, within a relatively small range of voltage difference between the cathode and the grid, under normal operating conditions. Since the second anode 32 of the picture tube 13 receives its voltage from the cathode of the regulator tube, the potential of that second anode is also held similarly steady.

As shown in Fig. 2, the picture tube 13 embodies also a first anode 42, a control grid 43 and a cathode 44. The video signal to the control grid is supplied from the usual video amplifier circuit of the receiver which need not be described herein.

The control grid 43 may receive a bias voltage from the receiver for automatic background illumination control through circuit components indicated generally by block 45. The bias voltage which is applied to the control grid 43 by manual adjustment for intensity or brilliance control is derived from a variable resistor or potentiometer 46 connected between the grounded cathode 44 and a more negative potential. In one receiver presently commercially available, that negative potential is about −100 volts; the first anode potential is about +270 volts and the potential for the second anode is about +9,000 volts.

The regulating system described herein takes care of voltage variations on the second anode of the picture tube due to adjustment of the intensity control or of the automatic background illumination control.

In the conventional system, the output rectified voltage from the high voltage diode 24 is applied directly to the second anode 32 of the picture tube. Any variation in the impedance of the picture tube, due to adjustment of the control electrode of the picture tube, is attended by a change in voltage across the Kinescope, with resultant change in the picture size.

By the introduction of the regulator tube 26 into the voltage supply circuit to the picture tube, the holding of the regulator grid at a fixed potential by the diode 30 and its condenser 30–*c* serves to hold the regulator cathode and therefore the picture tube second anode at a relatively steady potential. Adjustment of the control grid potential of the picture tube then properly modifies only the brilliance of the screen without changing the dimensions of the picture.

It may be noted here that the horizontal blocking oscillator transformer 22 is merely a convenient source of voltage for the grid of regulator tube 26. The drain on that source is theoretically zero, since no grid current flows in the regulator tube 26. Any other source could equally well be used, such as the vertical output transformer, the sixty cycle power line, etc., so long as that source would be independent of the variations in the surge power circuit.

Although the cathode and the heater of the regulator tube 26 appear to be independent, the system is inherently safe against too large a voltage difference developing between the heater and the cathode. If the load on the picture tube should increase excessively, the cathode to ground voltage would decrease. The grid would become relatively more positive momentarily and would take current from rectifier 30 and its condenser 30-c. The voltage from that rectifier and condenser would quickly drop, however, and lower the grid potential, and the heater, due to the fact that the blocking oscillator, that feeds the rectifier 30, has low power capacity as a generator source. The voltage between heater and cathode would thus be kept from increasing to an excessive value.

On the other hand, when the second anode voltage would increase, due to load removal, the cathode potential in tube 26 could not rise too high, due to the restraint of the relatively negative grid of that tube.

Figure 3:
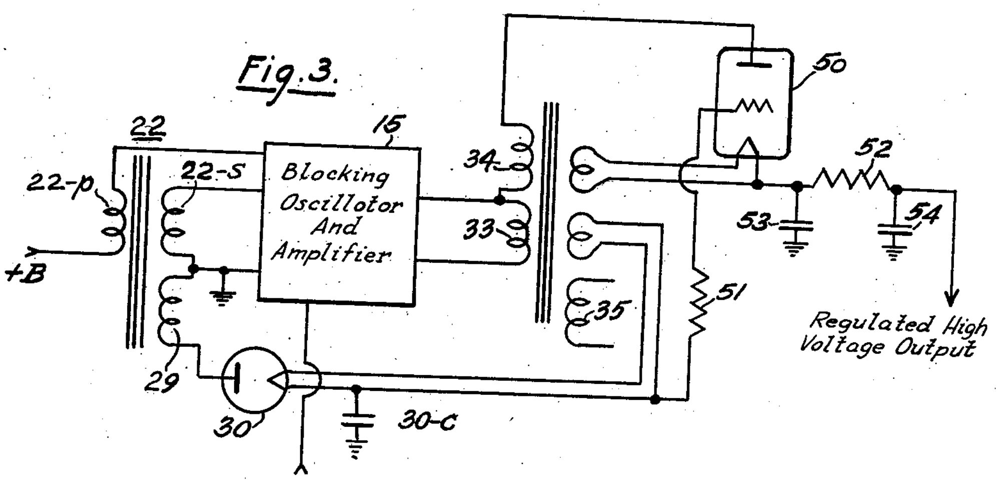
Figure 3, is a view similar to Fig 2, with a single regulating tube performing the combined functions of the diode and of the regulating tube of Fig. 2.

In Fig. 3, the functions of the high voltage diode rectifier and of the regulator tube are combined in one tube 50. It is used as a rectifier to rectify the surge voltage, but its impedance is controlled by a grid between cathode and plate. The grid is connected through a resistor 51 to a source of steady potential, which may be generated as in Fig. 2. When the current drain through the tube 50 by the picture tube is low and the high voltage at the plate of tube 50 rises, the cathode to grid potential rises a few volts, making the grid more negative and reducing electron flow, to reduce or stop the rectifying action.

In tube 50 the spacing between grid and plate should be greater than in present conventional receiver tubes to be able to take care of the high inverse peak voltage during non-rectification. The plate power-dissipating ability should be several watts.

The output of regulator tube 50 is supplied through a filter, consisting of a resistor 52 and condensers 53 and 54, to the picture tube of the type shown in Fig. 2. Where a bleeder resistor is used with a picture tube, the regulated voltage is applied to the upper terminal of that resistor.

A high degree of voltage regulation is not only unnecessary but may be undesirable. With these circuits a heavier load on the high voltage supply reduces slightly the amplitude of the horizontal deflection. By permitting the second anode potential to drop slightly the deflection sensitivity may be increased enough to compensate for the lowered current in the deflection yoke. With the use of the proper value of filter resistor 52 in the second anode supply, the proper amount of regulation can be obtained.

In order to maintain the desired aspect ratio, that is, the ratio of vertical dimension to horizontal dimension, the vertical deflection should be changed in proportion to the change in the horizontal deflection. That is accomplished by supplying plate potential from the same source to both the vertical and the horizontal deflection circuits through the common resistor 19 previously shown in Fig. 1.

When the high voltage supply to the second anode of the picture tube as in any of either Figures 2 or 3, represented by the block 17 of Fig. 1, draws more current, that extra load will be reflected back through the horizontal deflecting equipment 15 and the common resistor 19 to the power supply 18, of Fig. 1. The drop in voltage caused by resistor 19 will then reduce the plate voltage to the vertical deflecting equipment 14 also, with consequent reduction in the vertical deflection circuit output. Thus corresponding changes are assured in both deflection equipments, in response to load changes in the Kinescope, and the aspect ratio is maintained. That constitutes another important object and feature of this invention.

Equivalent control for maintaining the aspect ratio may, of course, be established by methods other than the use of the common resistor 19 for controlling a circuit parameter to vary the vertical deflection output. The use of resistor 19 is merely to illustrate a simple way of accomplishing that novel desirable result.

The invention obviously is not limited to the specific circuit arrangements shown, since these have been provided to illustrate various modes of utilizing the features of the invention. Other variations may be made in the circuit arrangement without departing from the spirit and scope of the invention as set forth in the appended claims.

I claim:

1. In a television receiver having a picture tube with a cathode, a control grid, a first anode and a second anode, and a horizontal deflecting yoke; and a saw-tooth generator to provide deflecting voltage for the yoke; and means including a transformer and a rectifier energized from said saw-tooth generator to establish a high direct voltage for the second anode, said means including means connecting one side of the output of said transformer to ground and the other side of the output to the anode of said rectifier, and a condenser connecting the cathode of said rectifier to ground, said condenser having sufficient capacity to satisfy the maximum demands of the varying load on the rectifier; the combination therewith, of means for adjustably varying the excitation of the picture tube control grid, a resistor to provide operating voltage for the second anode of the picture tube; and means energized by the high direct voltage from the rectifier and operative to establish a regulating action on the rectifier output circuit to supply a substantially constant voltage therefrom to the bleeder resistor to maintain the voltage to the second anode substantially constant, comprising a voltage regulating circuit including a regulator tube having a control grid, and means for maintaining the latter grid at substantially fixed voltage, whereby the picture area on the picture tube remains constant and independent of adjustment variations in the excitation of the control grid, said regulator tube having a cathode and an anode on opposite sides of the regulator tube control grid, means connecting the positive side of the rectified output of the first-named means to the anode of the regulator tube, condenser means connecting the cathode of the regulator tube to ground, said resistor being connected between the cathode of the regulator tube and the second anode of the cathode ray tube.

2. In a television system, a cathode ray tube having a cathode, a second anode and beam deflection means; a sweep generator connected to said beam deflection means; means for multiplying the output potential of said generator to peak values greater than the potential of said second anode; said means having two output leads; an electron discharge device having a cathode, an anode and a grid; condenser means connected at one end to said cathode and at its other end to one of said output leads; the other said output lead being connected to said anode; a source of alternating current for feeding the input of said sweep generator; means fed by said source including a stepup transformer and a rectifier for applying a relatively constant predetermined direct current potential of substantially the same value as the potential of the second anode between said grid and the other side of said condenser means with the positive side of said predetermined direct current potential being connected to the grid; and means connecting the positive side of the condenser means to the second anode and the negative side of the condenser to the cathode of the cathode ray tube.

3. In a television system; a cathode ray tube having a cathode, a second anode and beam deflection means; a source of alternating current; generator means energized by said source for generating sweep potential and applying it to said beam deflection means; means for multiplying the output potential of said generator means to peak values in excess of the operating potential of the second anode; and means for modifying said multiplied potential to a steady direct current operating potential for the second anode including all of the following: an electron discharge means having an anode connected to one side of the output of said multiplying means, a grid, and a cathode; means connecting the cathode of said discharge device to said second anode; means connecting the cathode of the cathode ray tube to the other side of the output of said multiplying means whereby the cathode-second anode circuit of the cathode ray tube acts as a high impedance load for the output of the electron discharge device; and a direct current source having a potential output substantially equal to the operating potential of the second anode with its positive side connected to said grid, the other side of the direct current source being connected to the cathode of the cathode ray tube.

4. A television system as defined in claim 3 in which the means for modifying said multiplied potential to a steady direct current operating potential includes condenser means for smoothing out variations in said potential and thereby causing said operating potential to be steady.

5. An electronic control circuit for a variable high impedance load comprising, means including a source of alternating current of higher potential than that to be applied to the load, a rectifier for rectifying the output of said source, a condenser connected across the output of the rectifier, said condenser having sufficient capacity to hold the potential across it relatively steady, an electron discharge device having an anode, a cathode and a grid, means connecting said anode to the positive side of said rectified output, a condenser connecting the negative side of said rectified output to said cathode, a high impedance load connected across the last-mentioned condenser, a source of direct current potential separate from said rectified output having a steady potential of substantially the same value as the operating potential of said load, and means connecting the positive side of said direct current source to said grid and the negative side of said direct current source to the negative side of said rectified output.

6. A control circuit as defined in claim 5 in which said first-named means has very poor voltage regulation so that when a human operator is shunted across the load, the potential across the load drops to a low harmless value.

7. A control circuit as defined in claim 6 in which the high impedance load is the second anode-cathode path of the cathode ray tube of a television receiver.

8. In a television receiver having a picture tube with a cathode, a control grid, a first anode and a second anode, and horizontal deflecting means; a saw-tooth generator to provide deflecting potential for said means; means including a transformer and a rectifier energized by the saw-tooth generator to establish a high voltage direct current for the second anode; a condenser across the rectified output of said rectifier of sufficient capacity to satisfy the maximum demands of the load; the negative side of the condenser being grounded; means energized by the high direct current voltage from the rectifier and operative to establish a regulating action on the rectifier output circuit to supply a substantially constant voltage therefrom comprising a voltage regulating tube having a control grid including means for maintaining the latter grid at a substantially fixed constant potential of substantially the same value as the operating potential of the second anode, said regulator tube having a cathode and an anode; means connecting the positive side of the rectified output to the anode of the regulator tube; condenser means connecting the cathode of the regulator tube to ground; and means connecting the cathode of the regulator means to said second anode; and means for adjustably varying the excitation of the picture tube control grid; whereby the picture area of the picture tube remains constant and independent of adjustment variations in the excitation of the control grid.

References Cited in the file of this patent

UNITED STATES PATENTS

| Number | Name | Date |
|---|---|---|
| 2,157,534 | George et al. | May 9, 1939 |
| 2,171,614 | Wendt | Sept. 5, 1939 |
| 2,247,082 | Gardiner | June 24, 1941 |
| 2,276,455 | Beers | Mar. 17, 1942 |
| 2,298,177 | Scott | Oct. 6, 1942 |
| 2,302,876 | Malling | Nov. 24, 1942 |
| 2,352,988 | Wilcox | July 4, 1944 |
| 2,371,897 | Knick | Mar. 20, 1945 |
| 2,372,419 | Ford et al. | Mar. 27, 1945 |
| 2,373,165 | Cawein | Apr. 10, 1945 |
| 2,419,496 | Lord | Apr. 22, 1947 |
| 2,435,414 | Sziklai et al. | Feb. 3, 1948 |
| 2,456,638 | Kenyon | Dec. 21, 1948 |
| 2,458,365 | Fyler | Jan. 4, 1949 |
| 2,458,532 | Schlesinger | Jan. 11, 1949 |
| 2,474,940 | Quirk | Mar. 22, 1949 |
| 2,525,698 | Mackensie | Oct. 10, 1950 |

FOREIGN PATENTS

| Number | Country | Date |
|---|---|---|
| 520,235 | Great Britain | Apr. 18, 1940 |
| 840,978 | France | May 8, 1939 |